United States Patent [19]

Tomishima et al.

[11] 4,028,144

[45] June 7, 1977

[54] SEMI-HARD MAGNETIC ALLOY WITH COMPOSITE MAGNETIC PROPERTY AND METHOD OF MAKING THE SAME

[75] Inventors: Hiroshi Tomishima; Toshio Takahashi; Kenichi Ono; Kazuhiro Kumasaka, all of Mito, Japan

[73] Assignee: Nippon Telegraph and Telephone Public Corporation, Tokyo, Japan

[22] Filed: Aug. 14, 1975

[21] Appl. No.: 604,790

[30] Foreign Application Priority Data

Aug. 22, 1974 Japan .............................. 49-96379

[52] U.S. Cl. ............................ 148/31.55; 148/120; 148/121; 75/171; 75/134 F

[51] Int. Cl.[2] ......................................... C04B 35/00

[58] Field of Search ....... 148/121, 120, 100, 31.55; 75/170, 171, 134 F

[56] References Cited

UNITED STATES PATENTS

| | | | |
|---|---|---|---|
| 2,002,689 | 5/1935 | Bozorth et al. | 148/100 |
| 2,271,040 | 1/1942 | Snock | 148/120 |
| 3,422,407 | 1/1969 | Gould et al. | 148/120 |
| 3,615,910 | 10/1971 | Tomita et al. | 148/31.55 |
| 3,928,085 | 12/1975 | Yamamura et al. | 75/170 |

*Primary Examiner*—Walter R. Satterfield

[57] ABSTRACT

A semi-hard magnetic alloy is described which consists of, by weight, 15–50% Co, 5–25% Ni, 1–9% Cr, balance Fe and incidental impurities and containing further a positive amount of up to 10% Cu or Ti. The alloy is characterized by exhibiting composite hysteresis characteristics as shown in FIG. 3 of the drawings. The alloy may be produced by a repetitive cold-working and subsequent annealing steps, the annealing step being carried out at temperatures of between 450° and 750° C.

8 Claims, 13 Drawing Figures

10%Ni-20%Co-9%Cr-4%Cu-Fe ALLOY

SEMI-HARD MAGNETIC ALLOY WITH COMPOSITE MAGNETIC PROPERTY AND METHOD OF MAKING THE SAME

BACKGROUND OF THE INVENTION

1. Field of the Invention

This invention relates to a semi-hard magnetic alloy having a composite magnetic property and a method of making the same, and more particularly to a semi-hard magnetic alloy which is a single magnetic alloy but has a composite magnetic property and a method of making such a semi-hard magnetic alloy.

2. Description of the Prior Art

Conventional semi-hard magnetic materials or hard magnetic materials which can be used in the same manner as the semi-hard magnetic materials, have such simple hysteresis loops as shown in FIGS. 1 and 2, respectively. For example, channel switches for an electronic switching system are mainly of the electromagnetic drive type and are roughly divided into a crossbar switch and a switching matrix. The DEX-10 electronic switching system developed by the present applicant employs a small crossbar switch. However, the use of a magnetic self-latching type reed relay with reference to the switching matrix has also been studied and a semi-hard magnetic material has been used therefor.

The magnetic self-latching type switches are classified into a Ferreed type switch having an excitable magnetic core formed of semi-hard magnetic material and a switch having a reed formed of semi-hard magnetic material. These switches utilize the hysteresis loops shown in FIGS. 1 and 2, respectively. Accordingly, they are greatly affected by a change in the driving current when opened and closed, especially when closed. This inevitably introduces complexity in the driving method therefor and requires an accurate control of the driving current.

On the other hand, in the case of using such a hysteresis loop as shown in FIG. 3, which is herein defined as the composite magnetic property (described in detail later on), there exists a stable state of no magnetic flux density, so that a sufficient margin can be provided for current variation. In this case, the opening and closing operations of the switch are achieved based on the smaller loop indicated by the thick line in FIG. 3. It has been found that the use of such a composite magnetic property presents various advantages for the operation of the switch. However, such a composite magnetic property cannot be obtained with any conventional single alloys. For obtaining such a composite magnetic property as shown in FIG. 3, there is known no other method than the mechanical cladding of two alloys of different magnetic properties, that is, two alloys having magnetic properties as given in FIGS. 1 and 2, respectively. Namely, the composite magnetic property of the channel switch for the electronic switching system requires that a smaller coercive force $H_c$ (a) be more than a few dozen oersteds and that a larger coercive force $H_c$ (b) be more than 200 oersteds. However, there has not been obtained as yet a magnetic material which is a single alloy and has such a hysteresis loop as shown in FIG. 3. The present applicants have continued their studies on a method of mechanical cladding of two alloys having different coercive forces. As a result of these studies, it has been found that the two alloys should be compatible with each other in heat treatment and working conditions, that cladding of alloys of different elementary compositions is especially difficult and that the number of conventional semi-hard magnetic material suitable for cladding is very small. Further, according to the studies by the present applicant, the system Fe-Co-Ni-Cr-Cu alloy (hereinafter referred to as the FCNC system alloy) has been developed which has a coercive force of 40 to 350 Oe and is capable of cold working so that, a clad-type composite magnetic core can be obtained which has the hysteresis loop shown in FIG. 3.

The magnetic material having the desired composite magnetic property can be obtained by mechanical cladding. The techniques therefor are disclosed in the Japanese Pat. No. 554,846 (Japanese Patent Publication No. 7836/69) and U.S. Ser. Nos. U.S. Patent No. 3,422,407 449,788.

However, such a clad-type magnetic material has the drawbacks of low mass-production and high manufacturing cost, as compared with a single alloy having the same composite magnetic property.

Further, a method for the manufacture of the system Co-V-Mn-Fe magnetic alloy has been developed by Western Electric Co., Inc. The chemical components and properties of this alloy are disclosed in U.S. Ser. Nos. 527,847 and 549,193. However, the composition of the alloy is entirely different from that of the alloy of this invention and the composite hysteresis loop of the alloy is also different from the composite magnetic property of the alloy of this invention. Moreover, the manufacture of the alloy requires a partial annealing for at least 30 seconds and this is achieved under extremely severe conditions in the prior art.

SUMMARY OF THE INVENTION

This invention is to provide a novel single magnetic alloy having a composite magnetic property (defined later) which is free from the aforesaid defects of the prior art.

Another object of this invention is to provide a method for the manufacture of the above said magnetic alloy such as to provide in the alloy the existence of phases of different magnetic properties.

The "composite magnetic property" and the "semi-hard magnetic material" herein mentioned are defined as follows:

The "composite magnetic property" is a composite hysteresis characteristic such as shown in FIG. 3 which has the smaller coercive force $H_c(a)$ and the larger coercive force $H_c(b)$ and includes, in the vicinity of the H-axis, a step at which there is almost no change in the magnetic flux density. The "semi-hard magnetic material" is a magnetic material which is a hard magnetic material but is used in the same manner as a soft magnetic material.

In accordance with this invention, the composite magnetic property can be obtained with one alloy. Accordingly, it is possible with this invention not only to overcome the difficulties in the manufacture of the alloy but also to provide a magnetic alloy which is highly suitable for mass production, low in manufacturing cost and excellent in property. The inventors have established the range of composition of the alloy which is composed essentially of cobalt Ni, nickel Ni and chromium and further contains one or more elements selected from the group consisting of copper and titanium the remainder being iron, and the manufacturing conditions for obtaining the composite magnetic property desired.

The above said objects and other advantages of this invention will become apparent from the following description taken in conjunction with the accompanying drawings.

DESCRIPTION OF THE PREFERRED EMBODIMENTS

Figure 1:
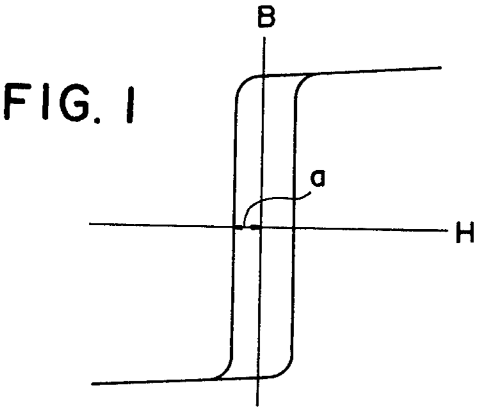
FIGS. 1 and 2 are graphs of hysteresis curves showing the properties of conventional soft and hard magnetic materials.
Figure 2:
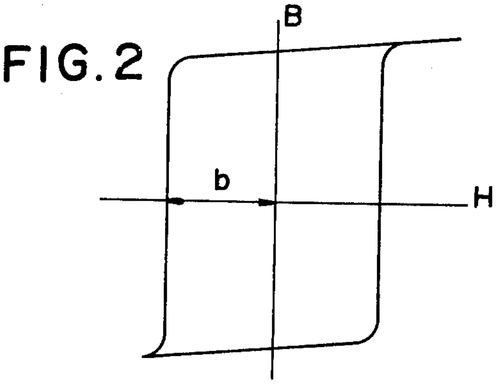
Figure 3:
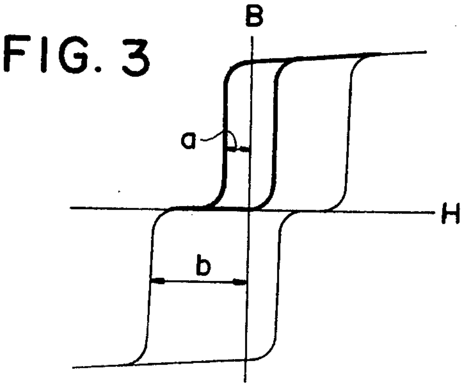
FIG. 3 is a graph of a hysteresis curve showing the composite magnetic property, which is obtained by mechanical cladding of the prior art but by using the single alloy of this invention.

As referred to in the foregoing, this invention is to provide a magnetic alloy which is a single alloy but has the composite magnetic property shown in FIG. 3, and a method for the manufacture of such a magnetic alloy. The following are considered as the factors in obtaining the composite magnetic property with a single alloy:

1. The structure of the alloy is composed of at least three phases. Two of the phases are ferromagnetic phases of different magnetic properties and the remaining one is a non-magnetic phase in which the two ferromagnetic phases are finely dispersed.

2. The structure of the alloy is composed of at least one ferromagnetic phase and one non-magnetic phase and the direction or the magnitude of anisotropy (for example, shape anisotropy) of the ferromagnetic phase is different.

3. The existence of the structure of magnetic domain. For example, the wasp-waisted hysteresis of Perminver which is a constant permeability material results from the difference in the stability of the magnetic domain wall caused by heat treatment.

In practice, since the structure and phase condition of the alloy are greatly changed by heat treatment and working, it is very difficult to ascertain the cause of the composite magnetic property. However, it is possible to create the states mentioned in items 1 and 2 above by suitable heat treatment and working.

In the prior art, the magnetic property of the semi-hard magnetic material is generally obtained by the process of cold working and annealing. The aforementioned FCNC system alloy for the clad-type composite magnetic core improves its magnetic property by the process of repeated cold working plus annealing Especially, a cold working after annealing provides a hysteresis loop of excellent squareness ratio. The present inventors have given attention to the process of repeated cold working and annealing and as a result of their studies, found that the composite magnetic property would appear over a certain region of composition of the magnetic material.

A description will now be given of the range of composition of the alloy according to this invention, that is, the ranges of composition of the alloy in which the desired composite magnetic property is obtainable.

Table 1 shows some of the results of experiments conducted for determining the ranges of the alloy composition with various combinations of the reduction ratio (described later) with the temperature range for annealing. The experimental values given in the table are those obtained by a second annealing. In the table, *a* and *b* indicate the coercive forces of the composite magnetic property shown in FIG. 3.

Table 1

| | Composition and Magnetic Property | | | | | | | | |
|---|---|---|---|---|---|---|---|---|---|
| | Composition (wt%) | | | | | | $H_c$ (Oe) | | Br |
| No | Co | Ni | Cr | Cu | Ti | Fe | a | b | (kG) |
| 1 | 10 | 20 | 7 | 3 | | remainder | non-magnetic | | |
| 2 | 10 | 30 | 7 | 3 | | " | " | | |
| 3 | 15 | 3 | 7 | 3 | | " | 25 | none | 17.0 |
| 4 | 15 | 5 | 7 | 3 | | " | 30 | 70 | 15.0 |
| 5 | 15 | 25 | 7 | 3 | | " | 10 | 30 | 7.0 |
| 6 | 15 | 15 | 8 | 3 | | " | 30 | 100 | 12.0 |
| 7 | 20 | 0 | 7 | 3 | | " | 23 | none | 10.5 |
| 8 | 20 | 10 | 7 | 3 | | " | 40 | 230 | 12.8 |
| 9 | 20 | 30 | 7 | 3 | | " | 3.0 | none | 9.0 |
| 10 | 20 | 10 | 0 | 0 | | " | 20 | none | 10.0 |
| 11 | 20 | 10 | 5 | 12 | | " | cracked during working | | |
| 12 | 20 | 10 | 8 | 3 | | " | 60 | 270 | 12.0 |
| 13 | 20 | 10 | 7 | 6 | | " | 65 | 300 | 10.4 |
| 14 | 20 | 10 | 6 | 9 | | " | 65 | 240 | 9.0 |
| 15 | 20 | 10 | 9 | 3 | | " | 44 | 313 | 9.0 |
| 16 | 20 | 10 | 7 | 3 | 2 | " | 50 | 300 | 10.8 |
| 17 | 20 | 10 | 9 | 4 | | " | 44 | 233 | 7.0 |
| 18 | 20 | 12 | 8 | 3 | | " | 48 | 297 | 7.5 |
| 19 | 20 | 14 | 7 | 3 | | " | 50 | 280 | 9.7 |
| 20 | 20 | 12 | 8 | 3 | 0.2 | " | 52 | 305 | 7.2 |
| 21 | 20 | 15 | 1 | 8 | | " | 30 | 80 | 15.0 |
| 22 | 20 | 12 | 7 | 10 | | " | 61 | 290 | 8.2 |
| 23 | 25 | 12 | 7 | 1.5 | | remainder | 55 | 208 | 9.0 |
| 24 | 25 | 12 | 7 | 3 | | " | 50 | 235 | 12.0 |
| 25 | 25 | 12 | 5 | 3 | | " | 70 | 145 | 13.5 |
| 26 | 25 | 14 | 10 | 3 | | " | 75 | 305 | 4.8 |
| 27 | 25 | 14 | 7 | 0.5 | | " | 45 | 246 | 12.3 |
| 28 | 25 | 15 | 3.5 | 5 | | " | 42 | 92 | 13.0 |
| 29 | 25 | 20 | 9 | 6 | | " | 15 | 60 | 7.1 |
| 30 | 30 | 12 | 7 | 3 | | " | 56 | 235 | 10.5 |
| 31 | 40 | 0 | 7 | 3 | | " | 95 | none | 10.0 |
| 32 | 40 | 5 | 5 | 3 | | " | 61 | 128 | 13.6 |
| 33 | 40 | 15 | 9 | 6 | | " | 12 | 50 | 6.3 |
| 34 | 45 | 5 | 7 | 3 | | " | 20 | 95 | 7.5 |
| 35 | 45 | 10 | 7 | 3 | | " | 60 | 175 | 11.6 |
| 36 | 45 | 20 | 9 | 6 | | " | 10 | 40 | 6.1 |
| 37 | 50 | 5 | 7 | 4 | | " | 23 | 65 | 10.6 |
| 38 | 50 | 25 | 9 | 6 | | " | 9 | 30 | 6.0 |
| 39 | 53 | 28 | 7 | 3 | | " | 3 | none | 4.8 |
| 40 | 55 | 10 | 7 | 3 | | " | cracked during working | | |
| 41 | 30 | 25 | 3 | 0 | 5 | " | 40 | 100 | 6.0 |
| 42 | 30 | 25 | 3 | 0 | 3 | " | 30 | 60 | 7.5 |
| 43 | 30 | 25 | 3 | 0 | 7 | " | 60 | 150 | 5.0 |
| 44 | 20 | 10 | 6 | 9 | 2 | " | cracked during working | | |

The present inventors have further carried out experiments on various compositions of the alloy set forth in the embodiments of this invention described later. As a result of this, it has been ascertained that the alloy presenting the desired composite magnetic property is composed essentially of iron, cobalt, nickel and chromium and contains one or more elements selected from the group consisting of copper and titanium. The ranges of the components of the alloy in which the composite magnetic property is obtained are 15 to 50 wt% of cobalt, 5 to 25wt% of nickel, 1 to 9wt% of chromium and 0.5 to 10wt% of copper and/or titanium. When titanium is used, the range of 3 to 7wt% is preferred and when both copper and titanium are used the titanium is preferably in the range of 0.2 to 7wt%

Next, a description will be made of the changes in the magnetic property due to heat treatment and cold working.

The alloy with the aforesaid compositional ranges is required to be repeatedly subjected to working and annealing for obtaining the desired composite magnetic property. It is necessary to bring about such a state in one alloy as if two alloys of different magnetic properties existed therein. To this end, experimental studies have been made of the composition of alloy and FIG. 4 is a graph showing how the magnetic property changes with the repetition of working and heat treatment.

The specimen used in molten in a Tammann furnace or a vacuum melting furnace into a predetermined alloy composition and then cast into a rod. The rod is subjected to hot working and homogenization treatment at a temperature above 1000° C (for about 1 hour), thereafter being quenched in water. The above treatment will hereinafter be referred to as the pre-treatment. Following the pre-treatment, cold working and annealing are repeated at least twice in the order of first cold working → first annealing → second cold working → second annealing.

Figure 4:
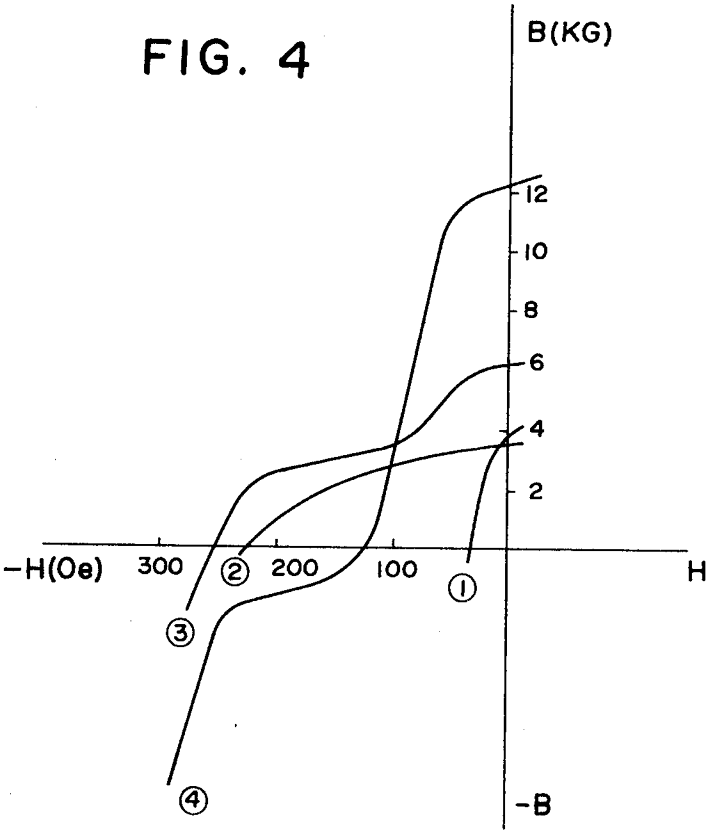
FIG. 4 is a graph showing magnetic properties at the stages of working and annealing to understand better the conditions for the manufacture of the alloy in accordance with one example of this invention, the quadrants II and III of the hysteresis curve are shown.

FIG. 4 shows the quadrants II and III of a hysteresis curve. Curve 1 indicates the magnetic property after the first cold working and curve 2 shows the magnetic property in the first annealing achieved at a temperature of 450° to 750° C. Under this condition, the composite magnetic property does not yet appear and only the coercive force increases.

Next, the second cold working is carried out. In this condition, a wasp-waisted hysteresis curve appears and this becomes clearer with an increase in the reduction ratio. The reduction ratio herein mentioned is defined as follows:

$$\text{Reduction ratio} = \frac{r_1^2 - r_2^2}{r_1^2} \times 100\%$$

where $r_1$ and $r_2$ are the radii of the rod before and after working, respectively. When the rod is further subjected to the second annealing at a temperature in the range of 450° to 750° C, the property corresponding to curve 3 is obtained. By this cold working of the rod, the property changes from the curve 3 to curve 4 and the squareness ratio and the residual magnetic flux density Br are enhanced, with the result that a remarkable composite hysteresis curve is obtained. Depending upon the composition of alloy, the property corresponding to curve 3 is obtained by the second cold working and the squareness ratio and the residual mangetic flux density Br are enhanced by the subsequent second annealing to provide the composite hysteresis corresponding to curve 4. By a third cold working, the squareness ratio and the residual magnetic flux density Br are even further enhanced.

The appearance of the composite magnetic property changes with the temperature and the reduction ratio adopted in each treatment. Table 2 shows this.

Table 2 (I)

Magnetic property depending upon combination of working with annealing
Alloy composed of 20wt% of Co, 12wt% of Ni, 8wt% of Cr, 3wt% of Cu and the remainder Fe

| Hc (Oe) a | Hc (Oe) b | Br (kG) |
|---|---|---|

| 1st (%) working | 1st annealing | 2nd (%) working | 2nd annealing | 3rd (%) working | 3rd annealing |
|---|---|---|---|---|---|
| 87% | 600° C | 74% | 550° C | 79% | 500°C |
| | Hc a / b / Br: – / 224 / 3.2 | Wasp-waisted 63 / 258 / 6.5 | composite 48 / 297 / 7.5 | composite 78 / 340 / 12.2 | composite – / 330 / 13.0 |
| 65% | 630° C | 57% | 420° C | cracked during working | |
| Hc a / b / Br: – / 17 / 3.0 | Hc a / b / Br: – / 220 / 26 | Hc a / b / Br: – / 297 / 5.1 | Hc a / b: – / 300, 5.5 | | |
| | → | 79% | 500° C | 72% | 450° C |
| | | wasp-waisted | 45 / 320 / 8.0 | composite 56 / 330 / 11.6 | composite 62 / 320 / 12.4 |
| | | → | 760° C | | |
| | | | Hc a / b: – / 50, 1.0 | | |

Table 2 (II)

Alloy composed of 20wt% of Co, 10wt% of Ni, 9wt% of Cr, 3wt% of Cu and the remainder Fe

| 1st (%) working | 1st annealing | 2nd (%) working | 2nd annealing | 3rd (%) working | 3rd annealing |
|---|---|---|---|---|---|
| 78% | 750° C | 48% | 600° C | 70% | 500° C |
| | | | | composite | composite |
| 17 5.2 | 60 1.0 | 47.2 10.3 | 205 3.6 | 60 260 8.2 | 40 280 9.2 |
| 52% | 600° C | 60% | 500° C | 55% | |
| | | composite | composite | composite | |
| 17 4.1 | 280 3.2 | 35 288 7.4 | 44 313 9.0 | 50 340 11.4 | |
| → | 560° C | 35% | 450° C | 80% | |
| | | | | composite | |
| | 140 7.0 | 160 9.0 | 165 10.2 | 40 220 12.1 | |
| 65% | 800° C | 90% | | | |
| | | | | | |
| 17 4.6 | 40 2.0 | 35 12.0 | | | |

Table 2 (III)

Alloy composed of 20wt% of Co, 10wt% of Ni, 9wt% of Cr and 4wt% of Cu

| 1st (%) working | 1st annealing | 2nd (%) working | 2nd annealing | 3rd (%) working | 3rd annealing |
|---|---|---|---|---|---|
| 39% | 628° C | 86% | 530° C | | |
| Hc (Oe) a b, Br (kG) | | Wasp-waisted | Composite | | |
| 10 2.5 | 200 1.5 | 25 210 7.5 | 63 190 10.6 | | |
| 78% | 625° C | 91% | 530° C | | |
| | | Wasp-waisted | Composite | | |
| 20 2.5 | 170 2.6 | 32 200 9.0 | 69 190 10.5 | | |
| → | 635° C | 75% | 500° C | 67% | 450° C |
| | | Wasp-waisted | Composite | Composite | Composite |
| | 190 1.8 | 20 235 6.5 | 44 233 7.0 | 86 325 9.7 | 96 310 10.2 |
| | | → | 530° C | 68% | |
| | | | Composite | Composite | |
| | | | 68 220 6.6 | 129 327 9.3 | |

Table 2 (III)-continued

Alloy composed of 20wt% of Co, 10wt% of Ni, 9wt% of Cr and 4wt% of Cu

| | | | | | |
|---|---|---|---|---|---|
| 91% | 625° C | 81% | 530° C | | |
| | | Wasp-waisted | Composite | | |
| 29 4.2 | 133 2.5 | 40 200 8.8 | 81 170 8.8 | | |
| → | 560° C | 81% | 530° C | | |
| | | Wasp-wasited | Composite | | |
| | 120 7.0 | 35 190 11.5 | 60 180 12.0 | | |
| → | 420° C | cracked during working | | | |
| | 25 5.0 | | | | |
| 78% | 850° C | 91% | 600° C | 86% Wasp-waisted | 540° C Composite |
| 20 2.5 | 40 1.8 | 42 4.5 | 180 2.0 | 25 200 7.8 | 50 190 9.5 |
| 78% | 850° C | 91% | 800° C | 86% | 760° C |
| 20 25 | 40 1.8 | 42 4.5 | 42 1.9 | 36 5.4 | 45 2.3 |

As it is evident from Table 2(I, II, III), when the annealing temperature is below 450° C, working is difficult and cracking occurs. On the other hand, when the annealing temperature is above 750° C, even if working and annealing are repeated, no composite magnetic property is obtained.

In the case where annealing at a temperature above 750° C is followed by working and annealing at a temperature in the range of 750° to 450° C, the composite magnetic property is obtained.

Accordingly, it is necessary to repeat annealing and working at a temperature in the range of 450° to 750° C.

The combination of the chemical components with working and annealing is an important factor, and hence will be described based on examples of this invention.

Example 1

Figure 5:
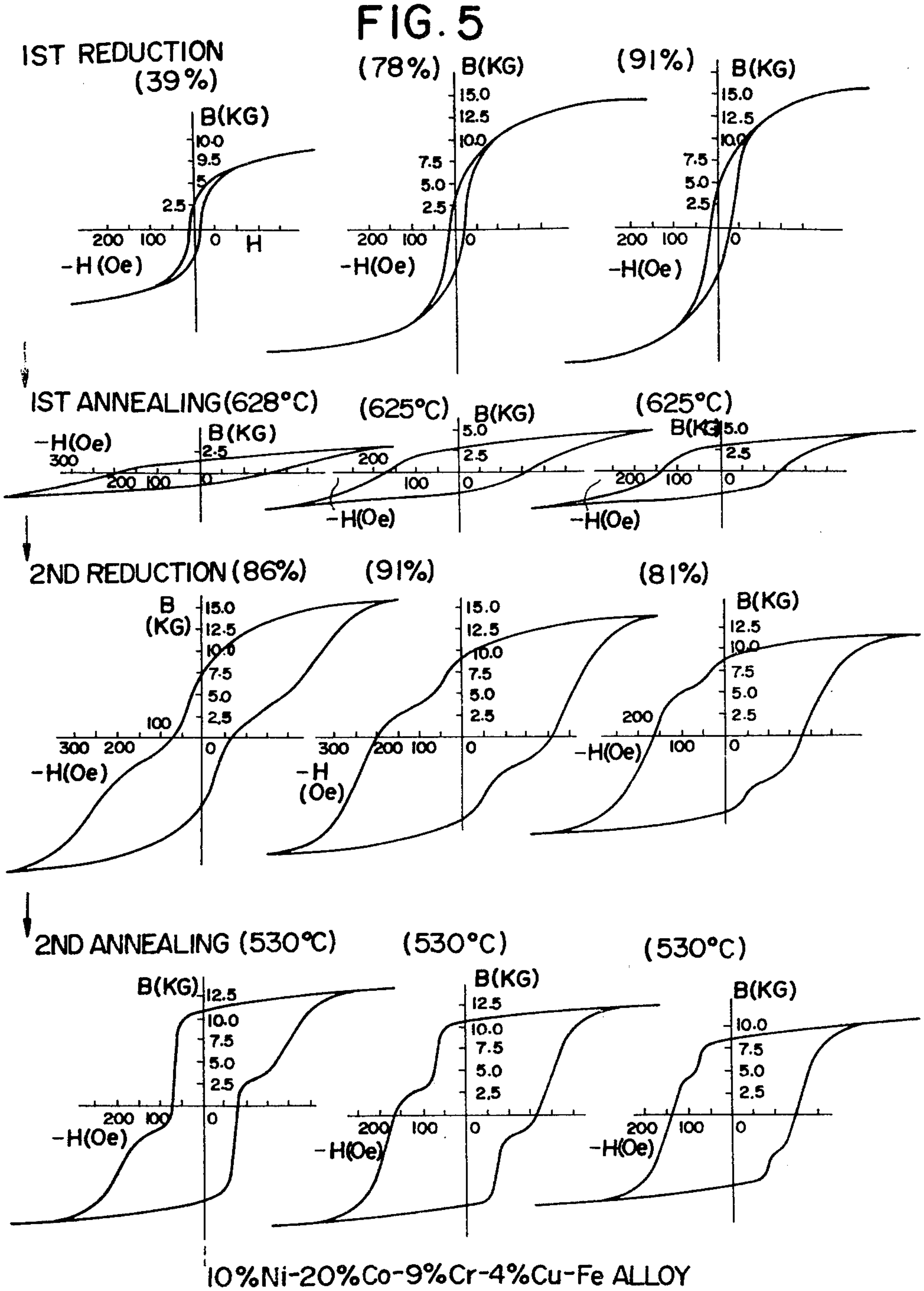
FIG. 5 illustrates a series of graphs showing changes in the property of an alloy composed of 20% of cobalt, 10% of nickel, 9% of chromium, 4% of copper and the remainder iron (all by weight) when the alloy was repeatedly subjected to cold working and annealing in accordance with another example of this invention.

A specimen composed of 20wt% of Co, 10wt% of Ni, 9wt% of Cr, 4wt% of Cu and the remainder Fe was subjected to the aforesaid pre-treatment and then repeatedly cold-worked and annealed. FIG. 5 shows changes in the magnetic properties of the specimen.

In FIG. 5, first reduction implies the reduction ratio by the first cold working and second reduction implies the reduction ratio by the second cold working. The annealing temperature should be such that the temperature for the second annealing is lower than that for the first annealing.

Next the properties shown in FIG. 5 and the influence thereon of each treatment will be qualitatively described.

a. First cold working

Since the first reduction ratio is the reduction ratio in the first cold working, an examination of the properties obtained by each treatment, with the first reduction ratio being used as parameter, indicates that an increase in the first reduction ratio causes an increase in the phase having the larger coercive force $H_c(b)$ to shift the step of the hysteresis toward the plus side. Namely, it will be understood that the position of the step can be controlled with the reduction ratio in the first cold working. This cold working transforms a non-magnetic $\gamma$ into a ferromagnetic phase $\alpha'$.

b. First annealing

With an increase in temperature, the ferromagnetic phase $\alpha'$ is transformed into the non-magnetic phase $\gamma$. In this invention, the temperature range in which the composite magnetic property appears is definitely defined.

c. Second cold working

The composite magnetic property appears when the reduction ratio is in excess of about 5:%. The hysteresis loop is wasp-waisted as shown in FIG. 5 and the coercive force $H_c$ and the residual magnetic flux density Br both increase.

d. Second annealing

The squareness ratio and the residual magnetic flux density Br are enhanced and a striking composite magnetic property is obtained. However, the composite magnetic property disappears when the annealing temperature exceeds a certain value.

e. Third cold working

This treatment further enhances the squareness ratio and the residual magnetic flux density Br.

Based on the above discussion, a description will be given in connection with the region of composition of the magnetic material in which the composite magnetic property is brought about.

The system Fe-Co-Ni alloy is a martensite transformation alloy, in which the ferromagnetic phase $\alpha'$ and the non-magnetic phase $\gamma$ exist. This non-magnetic phase $\gamma$ is transformed by cold working into the ferromagnetic phase $\alpha'$, as described above. And, as the temperature rises, the ferromagnetic phase is transformed into the non-magnetic phase. Accordingly, repetition of cold working and annealing is the repetition of transformation of the ferromagnetic phase $\alpha'$ into the non-magnetic phase $\gamma$ and vice versa. At the same time, the volume ratio of the phase $\alpha'$ to $\gamma$ is controlled and the phase $\alpha'$ is given to fine particles of well developed anisotropy. Such phase condition and phase variation are greatly affected by the amounts of cobalt and nickel contained and the additive element or elements. The addition of chromium not only affects the phase condition but also contributes to high coercive force which is one of the features of this invention.

EXAMPLE 2

3Kg of alloy composed of 20wt% of Co, 12wt% of Ni, 8wt% of Cr, 3wt% of Cu and the remainder Fe was molten and cast into a rod having a diameter of 30mm. After being scaled about 1mm, the rod was heated to 1150° C, forged by hot forging to have a diameter of 18mm, and thereafter quenched in water.

The rod was formed by cold working with a swaging machine into a rod having a diameter of 6.5mm (reduction rotio:87%) (first cold working). The rod was heat treated in a vacuum furnace at 600° C for 1 hour (first annealing). The stage of the first working and annealing is identified as (i). After the above treatment, a second cold working was achieved with the swaging machine to reduce the diameter of the rod to 3.3mm (reduction ratio:74%) and then a second annealing was effected at 550° C. This stage is identified as (ii). At stages (i) and (ii), the magnetic properties were as follows: (i) $H_c$ =224Oe and Br = 3.2kg; and (ii) $H_c(a)$ (corresponding to *a* in FIG. 3) = 48Oe, $H_c(b)$ (corresponding to *b* in FIG. 3) = 297Oe and Br = 7.5kG. Then, the next process was carried out. This process is called third cold working and annealing process. Namely, after the second annealing, the diameter of the rod was further reduced by a third cold working to 1.5mm (a reduction ratio:79%) and then the rod was subjected to a third annealing. As a result of this, the composite magnetic property was further improved: $H_c(a)$ was 67Oe, $H_c(b)$ was 325Oe and Br was 13Kg.

EXAMPLE 3

An alloy composed of 25wt% of Co, 12wt% of Ni, 7wt% of Cr, 3wt% of Cu and the remainder Fe was molten in a Tammann furnace and cast into a rod. The rod was heat treated at 1100° C without being forged, and then quenched in water. The rod was scaled to a diameter of 13mm and cold-worked with the swaging machine to a diameter of 7mm (first cold working), thereafter heat treated at 600° C for 1 hour (first annealing) (i). Following this, the rod was further worked with the swaging machine to a diameter of 3.2mm (second cold working) and then subjected to a second annealing at 520° C (ii). The magnetic properties at stage (i) were $H_c$ = 193Oe and Br = 10kG, and the composite magnetic property was slightly present. At stage (ii), the composite magnetic property became clear and $H_c(a)$ = 50Oe, $H_c(b)$ = 235Oe and Br = 12kG.

EXAMPLE 4

An alloy composed of 20wt% of Co, 12wt% of Ni, 8wt% of Cr, 3wt% of Cu and the remainder Fe was cast into a rod by a pre-treatment similar to that employed in Example 1. The rod was cold-worked and annealed in accordance with the order of the processes shown in Table 3 and the magnetic properties given in the table were obtained. The hysteresis characteristics corresponding to the processes I, II, III, IV, V, Vi and VIII are shown in FIGS. 6A to 6G, respectively.

It appears from Table 3 that, in the case of the alloy used in this example, ordinary hysteresis loops are obtained by a first cold working (the reduction ratio: 65%), a first annealing (630° C) and a second cold working (reduction ratio up to 57%) but that an increase in the second reduction ratio (79%) causes the hysteresis to be "wasp-waisted".

In the case of annealing (500° C) after the second working, and in the case of further effecting a third cold working, the composite magnetic property is enhanced. By a third working with a reduction ratio of 72%, $H_c(a)$ = 56Oe, $H_c(b)$ = 330Oe and Br = 11.0kG. By a third annealing at 450° C, the composite magnetic property was obtained such that $H_c(a)$ = 62Oe, that $H_c(b)$ = 320Oe and that Br = 12.4kG. The magnetic property, especially the coercive force $H_c$, is greatly affected by a first annealing temperature, a second reduction ratio and a second annealing temperature and these conditions differ slightly depending on the composition of alloy used. The range in which the coercive force $H_c$ can be controlled is that the smaller coercive forces $H_c(a)$ is 40 to 140Oe and that the larger coercive force $H_c(b)$ is 200 to 350Oe.

EXAMPLE 5

An alloy composed of 20wt% of Co, 10wt% of Ni, 9wt% of Cr, 3wt% of Cu and the remainder Fe was subjected to a pre-treatment similar to that employed in Example 1 and cast into a rod. The heat treatment conditions in this case were as follows:

First cold working → First annealing →
Reduction ratio:52%  600° C

Second cold working → Second annealing →
Reduction ratio:60%  500° C

Third cold working → Third cold working
Reduction ratio:30%  Reduction ratio:55%

Table 3

Figure 6A:
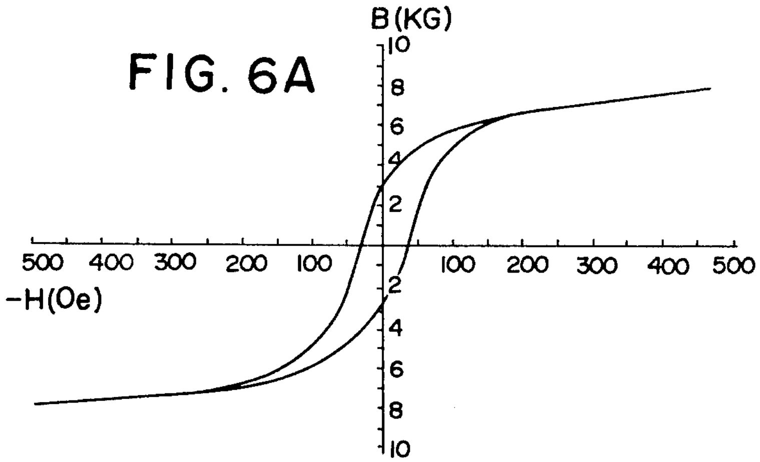
FIGS. 6A to 6G are graphs showing the property of an alloy composed of 20% of cobalt, 12% of nickel, 8% of chromium, 3% of copper and the remainder iron (all by weight) in respective processes in accordance with another example of this invention.
Figure 6B:
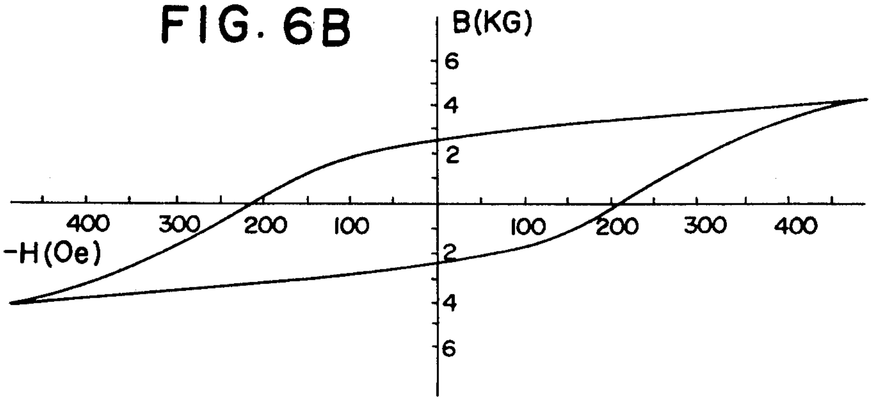
Figure 6C:
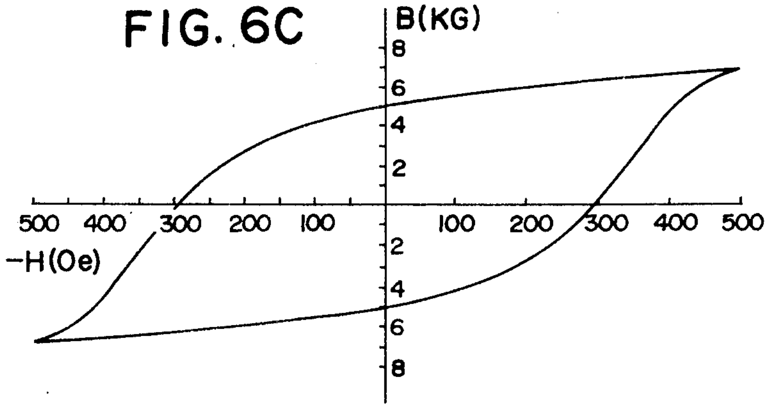
Figure 6D:
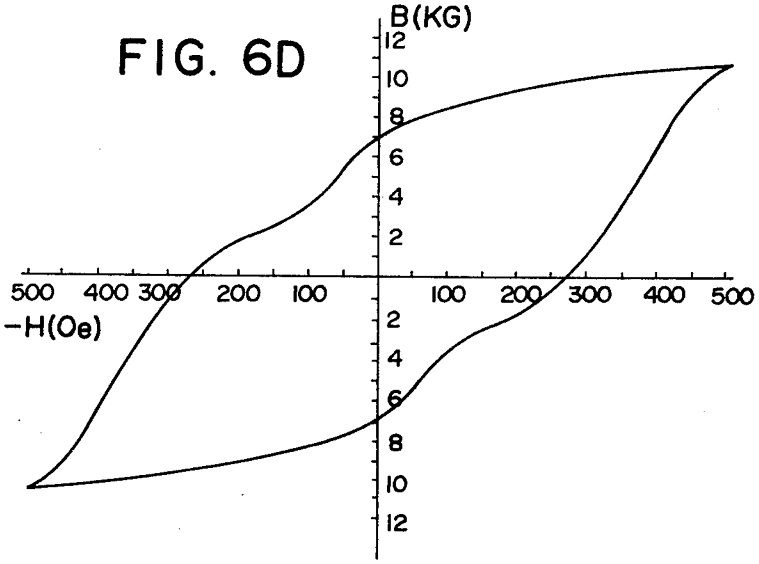
Figure 6E:
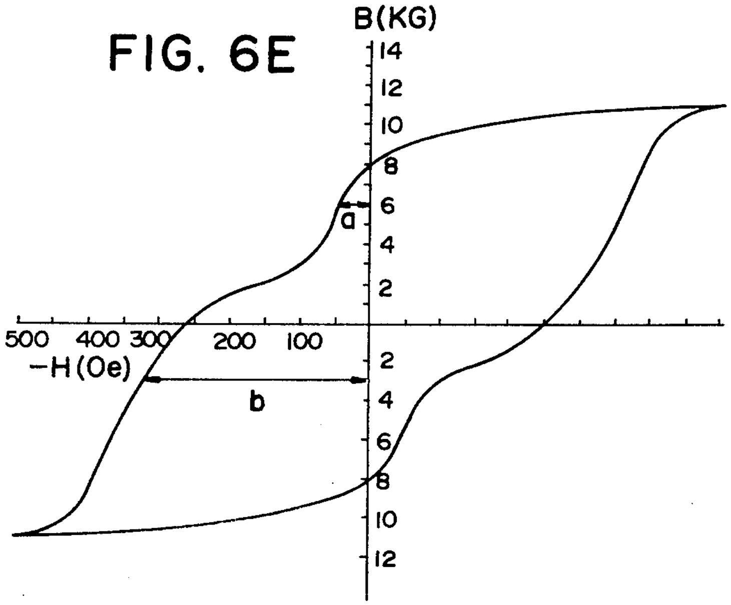
Figure 6F:
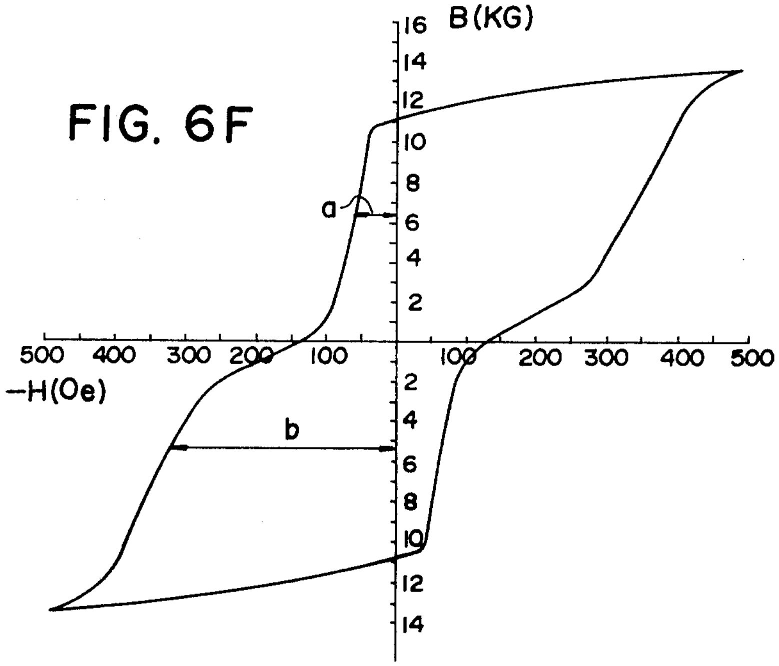
Figure 6G:
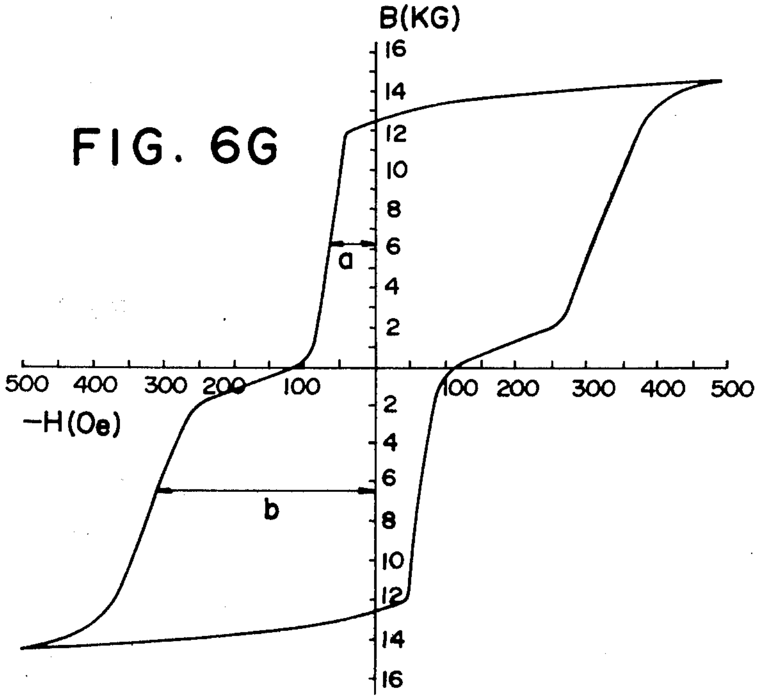

| | Process | $H_c$ (Oe) a | $H_c$ (Oe) b | Br (kG) | B560 (kG) | Hysteresis characteristic | Drawing |
|---|---|---|---|---|---|---|---|
| I | 65% 1st cold working | 17 | | 3.0 | 8 | Normal | FIG. 6A |
| II | 630° C 1st annealing | | 220 | 2.6 | 4.2 | Normal | FIG. 6B |
| III | 57% 2nd cold working | | 297 | 5.1 | 7 | Normal | FIG. 6C |
| IV | 79% 2nd cold working | | 263 | 7.0 | 10.9 | Wasp-waisted | FIG. 6D |
| V | 500° C 2nd annealing | 45 | 320 | 8.0 | 11.5 | Composite | FIG. 6E |
| VI | 72% 3rd cold working | 56 | 330 | 11.0 | 13.8 | Composite | FIG. 6F |
| VII | 450° C 3rd annealing | 62 | 320 | 12.4 | 14.4 | Composite | FIG. 6G |

The magnetic properties after the second annealing were $H_c(a) = 44Oe$, $H_c(b) = 313Oe$ and $Br = 9.0OkG$ (No. 15, Table 1). After the third cold working, $H_c(a) = 50Oe$, $H_c(b) = 310Oe$, $Br = 10.5kG$ and the squareness ratio $> 0.9$. By the third cold working with the reduction ratio of 58%, the magnetic properties were further enhanced and $H_c(a) = 50Oe$, $H_c(b) = 340Oe$, $Br = 11.4kG$ and the squareness ratio $> 0.9$.

Figure 7:
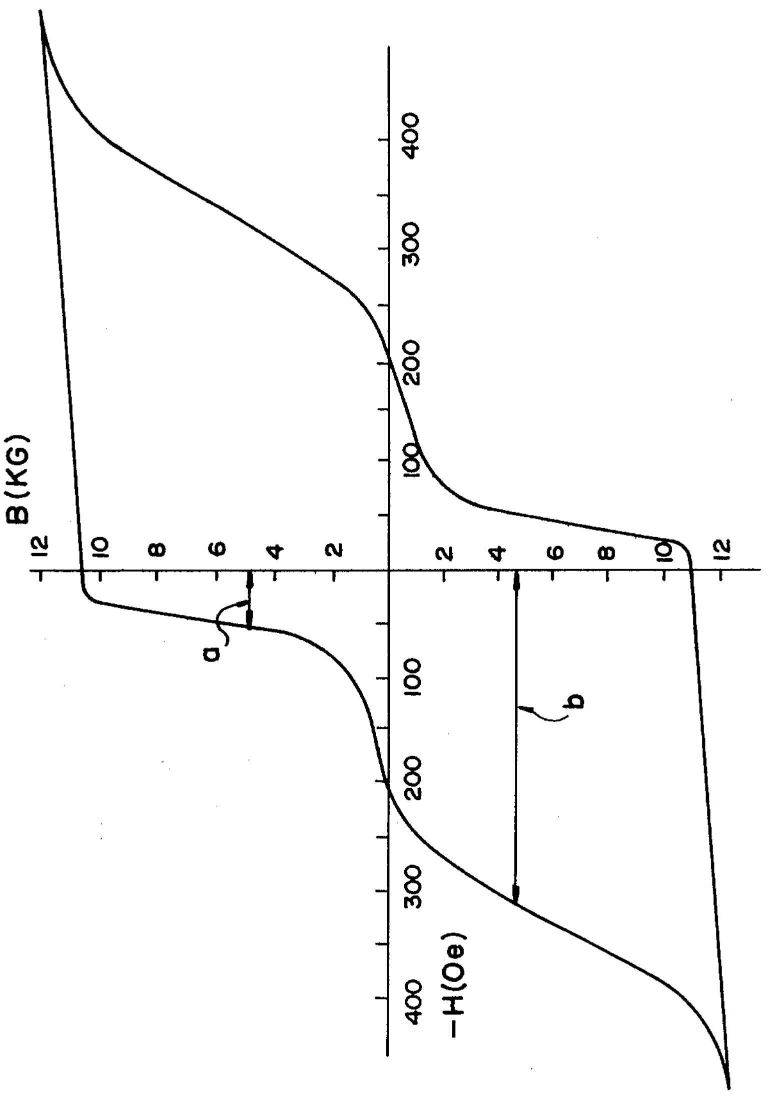
FIG. 7 is a graph showing the hysteresis characteristic of an alloy composed of 20% of cobalt, 10% of nickel, 9% of chromium, 3% of copper and the remainder iron (all by weight) in accordance with yet another example of this invention.

The hysteresis characteristic in this example is shown in FIG. 7.

EXAMPLE 6

An alloy composed of 20wt% of Co, 10wt% of Ni, 9wt% of Cr, 4wt% of Cu and the remainder Fe was subjected to a pre-treatment similar to that used in Example 3 and cast into a rod. The rod was cold-worked with a reduction ratio of 78% and then annealed at 635° C. Then, the rod was cold-worked with a reduction ratio of 75% and annealed at 500° C. The magnetic properties obtained after the second annealing were $H_c(a) = 44Oe$, $H_c(b) = 233Oe$ and $Br = 7.0OkG$ (No.17). When the rod was further subjected to the third cold working with a reduction ratio of 67%, $H_c(a)$ was 86Oe, $H_c(b)$ was 325Oe and Br was 9.7kG. Thus, the magnetic properties were enhanced. When the rod was further subjected to a third cold working at 450° C, $H_c(a)$ was 90 Oe, $H_c(b)$ was 310 Oe and Br was 10.2kG. Further, when the second annealing was carried out at 530° C, $H_c(a)$, $H_c(b)$ and Br were 68 Oe, 220 Oe and 6.6kg, respectively and then when the second cold annealing was followed by a third cold working with a reduction ratio of 68%, $H_c(a)$, $H_c(b)$ and Br were 129 Oe, 327 Oe and 9.3kG, respectively.

The following will describe the reasons for the limitations imposed on the ranges of chemical components.

1. Nickel

As a result of experiments in which chromium and copper were 7wt% and 3wt% respectively and cobalt was in the range of 10 to 50wt% and the amounts of iron and nickel were changed, it has been found that less than 5wt% of nickel does not make any difference between the larger and smaller coercive forces $H_c(b)$ and $H_c(a)$ of the composite magnetic property and that with more than 25wt% of nickel, no composite magnetic property is obtained and causing the larger coercive force $H_c(b)$ and the residual magnetic flux density Br to be less than 20 Oe and less than 10kG, respectively. Thus, with the above-said amounts of nickel, it is difficult to obtain a semi-hard magnetic material suitable for practical use. The experiments show that the composite magnetic property appears when nickel is in the range of 5 to 25wt% and, in this case, the difference between $H_c(b)$ and $H_c(a)$ is 15 to 260 Oe and Br has an appropriate value (about 10kG). Further, it has been found that the same is true of the case where chromium is 1 to 9wt% and copper is 0.5 to 10wt%.

2. Cobalt

As a result of experiments in which chromium and copper were 7 and 3wt%, respectively, and nickel was in the range of 0 to 30wt% and the amounts of iron and cobalt were varied, it has been found that more than 15wt% of cobalt increases the coercive force $H_c$ and the residual magnetic flux density Br but does not provide the composite magnetic property. When the amount of cobalt is more than 50wt%, working becomes difficult. Since the alloy of this invention requires working, alloys containing more than 50wt% of cobalt are not practical. Therefore, it is preferred that the amount of cobalt in the alloy presenting the composite magnetic property be in the range of 15 to 50wt%. It has also been found that the same is true of the case where chromium is in the range of 1 to 9wt% and copper is in the range of 0.5 to 10wt%.

3. Copper and Titanium

These are both non-magnetic metals and are diffused in the ferromagnetic alloy (composed of iron, cobalt, nickel and chromium) to provide for enhanced squareness ratio and increased coercive force. Experiments were conducted with alloys which were composed of 20wt% of Co, 12wt% of Ni, 7wt% of Cr and the remainder Fe and in which Cu was in the range of 0 to 10wt% of and Ti was in the range of 0 to 10wt% when used in place of Cu. In the absence of copper, no composite magnetic property was obtained and when 0.5wt% of copper was added, the composite magnetic property was obtained. When the amount of copper was further increased, the composite magnetic property became more relevant and when the amount of copper was 3wt%, the larger coercive force $H_c(b)$ reached its maximum. A further increase in the amount of copper introduced brittleness and, more than 10wt% of copper made working difficult, expecially hot working.

On the other hand, when the amount of titanium is zero, no composite magnetic property is obtained as in the case of the amount of copper being zero. When the amount of titanium is in the range of 3 to 7wt%, the difference between the larger and smaller coercive force $H_c(a)$ and $H_c(b)$ becomes large (more than 50 Oe), which is suitable for obtaining the composite magnetic property but, in this case, workability generally deteriorates. Especially when the amount of titanium is in excess of 7wt%, working is very difficult.

For the above reasons, the composite magnetic property is obtained with alloys containing 0.5 to 10wt% of copper and 3 to 7wt% of titanium. The above indicates that the composite magnetic property can be obtained even if copper and titanium are added together. However, when the total amount of them exceeds 10wt%, working is difficult. Similar results were obtained with other compositions of iron, nickel and chromium than the above one (20wt% of Co, 10wt% of Ni, 7wt% of chromium and the remainder Fe).

4. Chromium

Experiments were carried out with alloys which were composed of 20wt% of cobalt, 10wt% of nickel, 3wt% of copper and the remainder iron and in which the amount of chromium was in the range of 0 to 10wt%. With the amount of chromium being zero, no composite magnetic property is obtained but when the amount of chromium is more than 1wt%, the composite magnetic property appears. However, more than 10wt% of chromium causes the residual magnetic flux density to become lower than 6kG and the alloy cannot be put to practical use. In view of the above, the amount of chromium should be 1 to 10wt%. The same results were obtained with other alloy compositions.

Of course, the reduction ratio in the cold working process and the temperature for the annealing process is determined by the amount of each chemical component of the alloy and be the desired composite magnetic property to be obtained. Since a magnetic alloy having the desired property can be realized with one alloy, the mechanical cladding of two alloys of different properties as in the prior art is no longer necessary and the difficulties in the manufacture are overcome. Further, in practical use, where, miniaturization of switches and lowering of driving power are contemplated, this invention is of particular utility.

It will be apparent that many modifications and variations may be effected without departing from the scope of this invention.

We claim as our invention

1. A cold-worked and annealed semi-hard magnetic alloy consisting essentially of, by weight, 15–50% Co, 5–25% Ni, 1–9% Cr, 0.5–10% Cu, balance Fe and incidental impurities, and further characterized by exhibiting composite hysteresis characteristics as shown in FIG. 3.

2. A cold-worked and annealed semi-hard magnetic alloy consisting essentially of, by weight, 15–50% Co, 5–25% Ni, 1–9% Cr, 0.2–7% Ti, balance Fe and incidental impurities, and further characterized by exhibiting composite hysteresis characteristics as shown in FIG. 3.

3. A cold-worked and annealed semi-hard magnetic alloy consisting essentially of, by weight, 15–50% Co, 5–25% Ni, 1–9% Cr, 0.2–7% Ti, 0.5–10% Cu, balance Fe and incidental impurities, the sum total of Cu and Ti not exceeding 10%, and further characterized by exhibiting composite hysteresis characteristics as shown in FIG. 3.

4. The alloy according to claim 1, wherein Co is 20%, Ni is 12%, Cr is 8%, Cu is 3% and Fe is 57%, by weight.

5. The alloy according to claim 1, wherein Co is 20%, Ni is 10%, Cr is 9%, Cu is 3% and Fe is 58%, by weight.

6. The alloy according to claim 1, wherein Co is 20%, Ni is 10%, Cr is 9%, Cu is 4% and Fe is 57%, by weight.

7. The alloy according to claim 1, wherein Co is 25%, Ni is 12%, Cr is 7%, Cu is 3% and Fe is 53%, by weight.

8. A method of making a semi-hard magnetic alloy exhibiting composite hysteresis characteristics as shown in FIG. 3, which comprises the steps of providing an alloy composition consisting essentially of, by weight, 15–50% Co, 5–25% Ni, 1–9% Cr and an element selected from the group consisting of Cu and Ti, balance Fe and incidental impurities, repeatedly and alternately cold working and annealing the alloy, said annealing being carried out at temperatures of between 450 and 750° C, the alloy composition being further characterized in that when the selected element is copper, this is present in the range of 0.5–10% by weight, when the selected element is titanium, this is present in the range of 0.2–7% by weight, and when the selected elements are both copper and titanium the sum total thereof does not exceed 10% by weight.

* * * * *